United States Patent
Pourciau, Sr.

[19]

[11] Patent Number: 6,019,414
[45] Date of Patent: Feb. 1, 2000

[54] RAIN DEFLECTOR CHUTE

[76] Inventor: Ronald J. Pourciau, Sr., 14825 Taurus Ave., Pride, La. 70770

[21] Appl. No.: 09/105,886

[22] Filed: Jun. 26, 1998

[51] Int. Cl.⁷ .......................................................... B60J 1/20
[52] U.S. Cl. ..................... 296/95.1; 296/154; 160/DIG. 4
[58] Field of Search .................................... 296/152, 154, 296/213, 95.1; 160/DIG. 4, DIG. 3, 370.21

[56] References Cited

U.S. PATENT DOCUMENTS

| | | | |
|---|---|---|---|
| 2,034,342 | 3/1936 | Hay . | |
| 2,575,933 | 11/1951 | Thorne . | |
| 2,599,014 | 6/1952 | Pritchard . | |
| 2,599,015 | 6/1952 | Pritchard . | |
| 2,625,358 | 1/1953 | Griffin . | |
| 3,476,436 | 11/1969 | Martin | 296/95.1 |
| 4,426,111 | 1/1984 | Smith | 296/95 R |
| 4,558,633 | 12/1985 | Lingg | 98/2.13 |
| 4,685,718 | 8/1987 | Steenblik et al. | 296/154 |
| 4,923,241 | 5/1990 | Miller | 296/154 |
| 5,251,953 | 10/1993 | Willey | 296/152 |
| 5,460,425 | 10/1995 | Stephens | 296/152 |
| 5,476,302 | 12/1995 | Ronci | 296/99.1 |

Primary Examiner—Joseph D. Pape
Attorney, Agent, or Firm—Joseph N. Breaux

[57] ABSTRACT

A rain deflector chute comprising a first planar chute member parallelly couplable to the roof top of a vehicle. A second planar chute member downwardly sloped from the top of the window wherein the second planar chute member radially projects at an angle from the side of the window a distance which does not exceed the radial distance from which a side rear view mirror projects from the side of the vehicle. A vertical planar chute member which couples the first planar chute member to the second planar chute member. A front deflector coupled to the front of the second planar chute member and a rear deflector coupled to the rear of the second planar chute member.

1 Claim, 2 Drawing Sheets

RAIN DEFLECTOR CHUTE

TECHNICAL FIELD

The present invention relates to rain deflectors and, more particularly, to a rain deflector chute comprising a first planar chute member parallelly couplable to the roof top of a vehicle; a second planar chute member downwardly sloped from the top of the window wherein the second planar chute member radially projects at an angle from the side of the window a distance which does not exceed the radial distance from which a side rear view mirror projects from the side of the vehicle; and a vertical planar chute member which couples said first planar chute member to said second planar chute member.

BACKGROUND OF THE INVENTION

While delivering mail or other packages in the rain, the mail person or other delivery personnel and the mail or other packages may become wet as the mail or other packages are placed in mail boxes. Furthermore other precipitation such as snow, hail etc. may become bothersome as the mail person or other delivery personnel delivers the mail or other packages. Henceforth, several attempts have been made to devise exteriorly mounted deflectors to shield the window from rain or other precipitation and the mail person or other delivery personnel when placing mail or packages in mail boxes.

One such attempt is described in U.S. Pat. No. 5,460,425, to Stephens, entitled "GUTTER AND VISOR SYSTEM FOR A WINDOW OF A VEHICLE." The invention, by Stephens, discloses a gutter and visor system positionable near a window of a vehicle. The gutter and visor system comprises an interior section which is vertically positioned and having an adhesive member coupled thereto. The intermediate section is slightly curved downward from the top of the interior section to the bottom of the interior section. The bottom portion of the intermediate section has an exterior section which services as a gutter.

Another attempt is described in U.S. Pat. No. 4,923,241, to Miller, entitled "WEATHER WINDOW SHIELD FOR AUTOMOTIVE VEHICLES AND THE LIKE." The invention, by Miller, discloses an optically transparent weather window shield including a main body with a rain run-off channel and a downwardly angled front portion for wind and rain deflection. The shield is designed to be fitted into a window channel at the upper forward portion of the window opening.

U.S. Pat. No. 4,685,718, to Steenblik et al. entitled "DEVICE FOR ATTACHING RAIN SHIELDS TO MOTOR VEHICLES" discloses a device for attaching rain shields to motor vehicle windows. The retainer means holds rain shields in the upper horizontal casing of motor vehicle windows that are fitted with a resilient seal.

U.S. Pat. No. 4,558,633, to Lingg, entitled "WEATHERSHIELD FOR AUTOMOBILES" discloses a weathershield having a body portion adapted to conform to the configuration of the window frame. The weathershield is affixed to the window frame at the outer edge regions.

U.S. Pat. No. , by 4,426,111, entitled "AUTOMOBILE RAIN SHIELD" discloses a rain shield detachably mountable on an automobile. The shield is preferably a flat, flexible, elongated member of metal or plastic. The shield is attached to the roof trough or side via clips or other attaching means.

U.S. Pat. No. 5,476,302, to Ronci, entitled "RAIN COVER FOR CAR DOOR" discloses a rain and sun cover for automobiles that is attached at one end to a roller and at the other end to the car door. When the door is opened, the cover will unroll and provide a sheltered area. The roller is attached to the interior of the vehicle.

While each of the above deflectors functions as desired, none of them have a rain deflector chute comprising a first planar chute member parallelly couplable to the roof top of a vehicle; a second planar chute member downwardly sloped from the top of the window wherein the second planar chute member radially projects at an angle from the side of the window a distance which does not exceed the radial distance from which a side rear view mirror projects from the side of the vehicle; and a vertical planar chute member which couples said first planar chute member to said second planar chute member.

SUMMARY OF THE INVENTION

The preferred embodiment of the rain deflector chute of the present invention solves the aforementioned problems in a straight forward and simple manner. What is provided is a rain deflector chute comprising a first planar chute member parallelly couplable to the roof top of a vehicle; a second planar chute member downwardly sloped from the top of the window wherein the second planar chute member radially projects at an angle from the side of the window a distance which does not exceed the radial distance from which a side rear view mirror projects from the side of the vehicle; and a vertical planar chute member which couples said first planar chute member to said second planar chute member.

The rain deflector chute for a vehicle, of the present invention, comprises: a first planar chute member parallelly couplable to an exterior surface of a roof top of the vehicle; a second planar chute member downwardly sloped from a top of a window wherein the second planar chute member radially projects at an angle from a side of the window; a front deflector member couple to a front edge of said second planar chute member for deflecting wind, rain or other precipitation as the vehicle is propelled forward wherein said front deflector member serves to chute rain or other precipitation running off the front of said second planar chute member away from said window and serves to support said second planar chute member to maintain said second planar chute member a predetermined distance from the horizontal plane of said window; a rear deflector member coupled to a rear edge of said serves to chute rain or other precipitation running off of the rear of said second planar chute member away from said window and serves to support said second planar chute member to maintain said second planar chute member the predetermined distance from the horizontal plane of said window; and, a vertical planar chute member coupled to said first planar chute member to form an L-shaped member and coupled to said second planar chute member.

In view of the above, an object of the present invention is to provide a rain deflector chute which can be permanently or removable mounted to the exterior surface of the roof of a vehicle. For example, the first planar chute member may be magnetically coupled to the roof of the vehicle or VELCRO may be used.

Another object of the present invention is to provide a rain deflector chute which is uniquely designed to chute rain or other precipitation off of the roof, as well as, the rain or other precipitation immediately adjacent to the window to deflect the rain or other precipitation away from the driver or passenger.

A further object of the present invention is to provide a rain deflector chute with a front deflector and a rear deflector which allows rain or other precipitation to flow off the front and rear sides of the second planar chute member.

It is a still further object of the present invention to provide a front deflector which deflects wind, rain and other precipitation as the vehicle is propelled forwardly.

It is a still further object of the present invention to provide a rain deflector chute which does not hinder the closing or opening of the window.

In view of the above objects, it is a feature of the present invention to provide a rain deflector chute which is simple to manufacture.

Another feature of the present invention is to provide a rain deflector chute which is relatively simple structurally.

A further feature of the present invention is to provide a rain deflector chute which is simple to use and install.

The above and other objects and features of the present invention will become apparent from the drawings, the description given herein, and the appended claims.

BRIEF DESCRIPTION OF DRAWINGS

For a further understanding of the nature and objects of the present invention, reference should be had to the following detailed description, taken in conjunction with the accompanying drawings, in which like elements are given the same or analogous reference numbers and wherein.

DESCRIPTION OF THE EXEMPLARY EMBODIMENT

Figure 1:
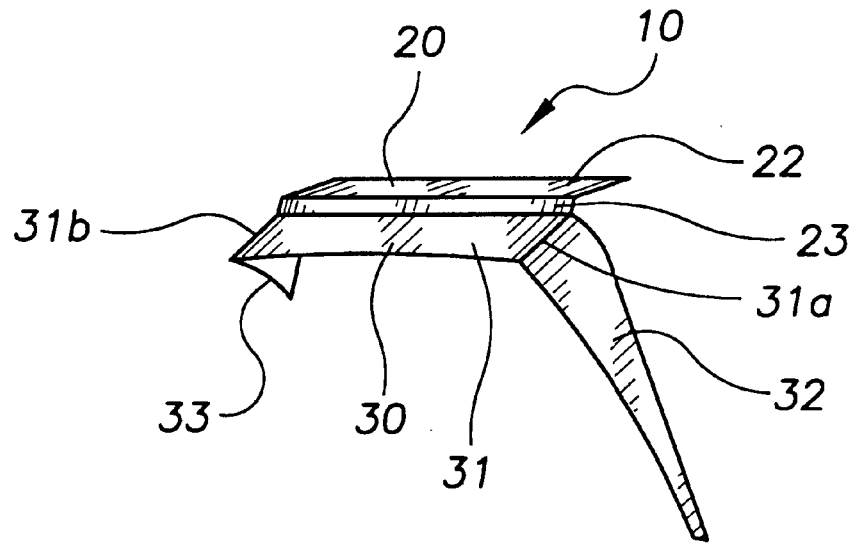
FIG. 1 illustrates a perspective view of the preferred embodiment of the rain deflector chute for automobiles of the present invention.
Figure 3:
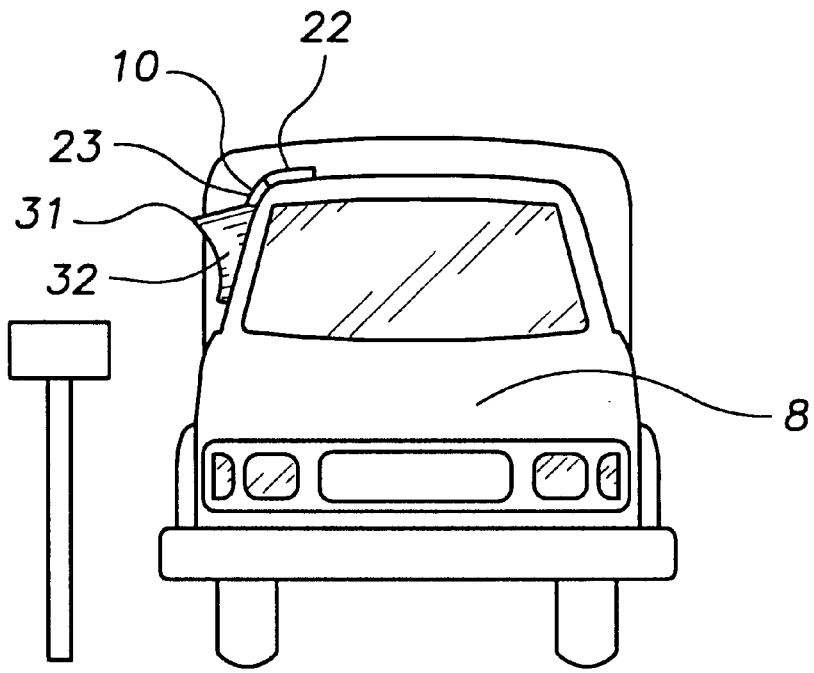
Figure 2:
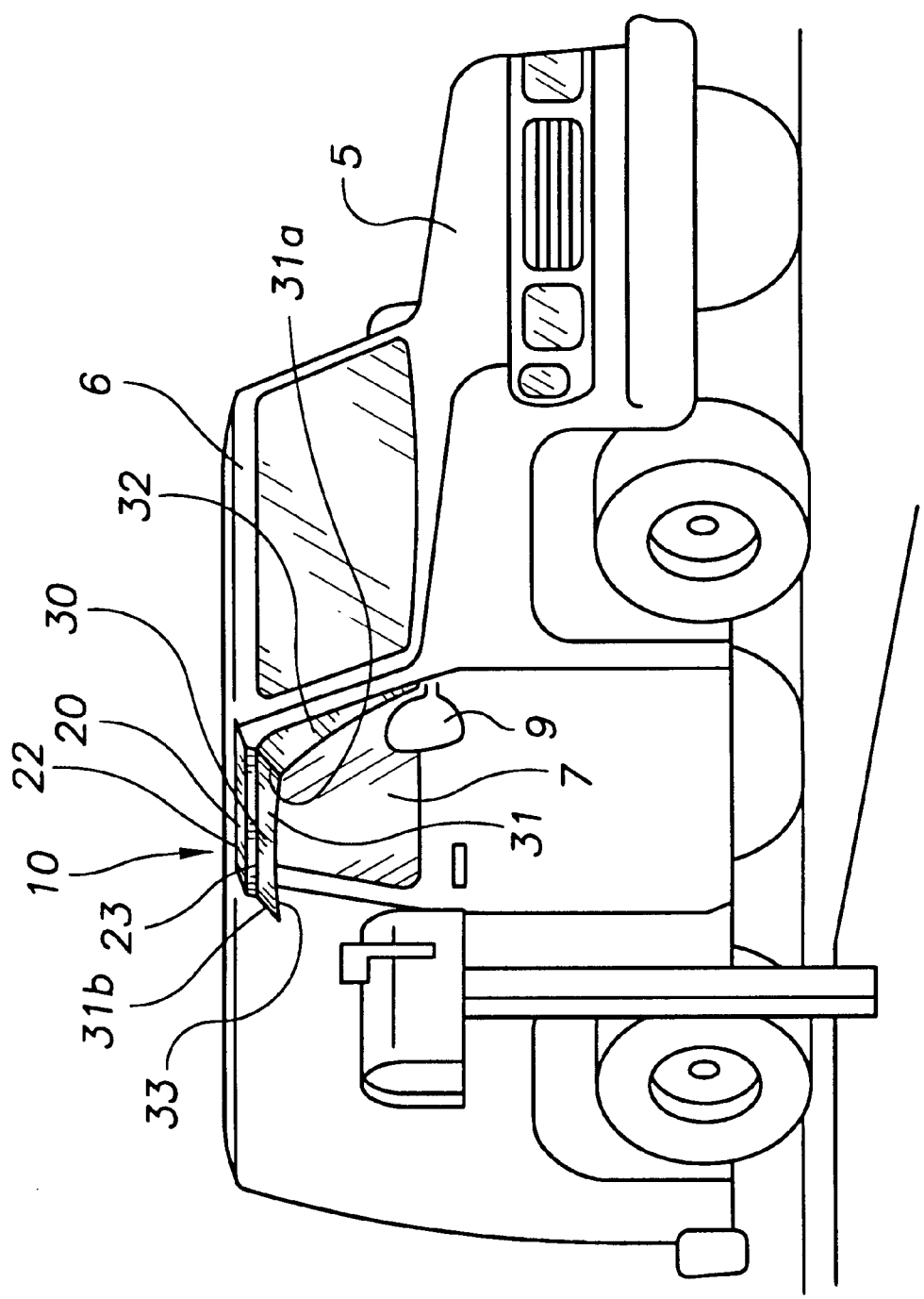
FIG. 2 illustrates a perspective view of the rain deflector chute for automobiles of the present invention coupled to a U.S. Postal vehicle; and, FIG. 3 illustrates a side view of the rain deflector chute coupled to a delivery vehicle.

Referring now to the drawings, and in particular FIGS. 1–3, the rain deflector chute of the present invention is designated generally by the number 10. Rain deflector chute 10 is comprised of roof top coupling member 20 and deflector member 30.

Roof top coupling member 20 comprises a L-shaped member having first planar chute member 22 and vertical planar chute member 23 which is substantially perpendicularly coupled to first planar chute member 22. First planar chute member 22 is parallelly couplable to the exterior surface of roof 6 of vehicle 5 wherein first planar chute member 22 may be either permanently or removably coupled parallelly to the exterior surface of roof 6 of vehicle 5. As shown in FIG. 2, vehicle 5 is a U.S. Postal vehicle which is commonly used to deliver mail. Nevertheless, rain deflector chute 10 may be coupled to the exterior surface of the roof of other vehicles such as delivery truck 8, shown in FIG. 3. Additionally, rain deflector chute 10 may be coupled to other automobiles.

As can be readily seen, the L-shaped member defined by first planar chute member 22 and vertical planar chute member 23 serves to coupled rain deflector chute 10 to vehicle 5, as well as, provides a chute for directing the rain or other precipitation onto deflector member 30 and away from an open window 7.

If first planar chute member 22 is removably coupled to the exterior surface of roof 6, first planar chute member 22 may be secured to the exterior surface of roof 6 via VELCRO or other quick release fastening means. For example, the bottom side of first planar chute member 22 may be provided with a magnetized surface which would magnetically adhere to the exterior surface of roof 6. VELCRO or a magnetic coupling of rain deflector chute 10 allows rain deflector chute 10 to be quickly removed and installed as needed or desired. The VELCRO type fastening system or the magnetic type coupling would allow rain deflector chute 10 to be easily installed while the driver is sitting in vehicle 5.

If first planar member 22 is permanently coupled to the exterior surface of roof 6, first planar member 22 may be secured to the exterior surface of roof 6 via an adhesive or other permanently attaching mechanism which would secure first planar member 22 to the exterior surface of roof 6.

Vertical planar chute member 23 has coupled thereto deflector member 30. The length of vertical planar member 23 allows deflector member 30 to be position at the top of window 7.

Deflector member 30 comprises second planar chute member 31 having a length which extends from the front to the rear of window 7, front deflector member 32 and rear deflector member 33. Second planar chute member 31 is downwardly sloping from the top of window 7 wherein second planar chute member 31 radially projects at an angle from the side of the window a distance which does not exceed the radial distance from which side rear view mirror 9 projects from the side of vehicle 5.

As shown, second planar chute member 31 is sloping downward from vertical planar chute member 23 such that second planar chute member 31 is neither vertically disposed or horizontally disposed. The other words, second planar chute member 31 provides a sloped surface to allow rain to run off therefrom a sufficient distance away from open window 7.

Front edge 31a of second planar chute member 31 has coupled thereto front deflector member 32 which extends from the top of window 7 to the bottom of window 7 in close proximity to side rear view mirror 9. Front deflector member 32 serves to deflect wind, rain or other precipitation as vehicle 5 is propelled forward and serves to chute rain or other precipitation running off the front of second planar chute member 31 away from window 7. Furthermore, front deflector member 32 serves to support second planar chute member 31 to maintain second planar chute member 31 a predetermined distance from the horizontal plane of window 7.

Front deflector member 32 has a triangularly shaped contour wherein the base of the triangularly shaped contour is coupled to front edge 31a and the peak of the triangularly shaped contour is in close proximity to side rear view mirror 9.

Rear edge 31b of first planar chute member 31 has a coupled thereto rear deflector member 33 which serves to chute rain or other precipitation running off of the rear of second planar chute member 31 away from window 7. Furthermore, rear deflector member 33 serves to support second planar chute member 31 to maintain second planar chute member 31 a predetermined distance from the horizontal plane of window 7.

In the preferred embodiment, rain deflector chute 10 is made of plexiglass. Nevertheless, other acrylic material, plastic or metal sheet material may be used. Furthermore, it is preferred that the plexiglass is smoked or optically opaque to shade the driver or passenger from the sun.

It is noted that the embodiment of the rain deflector chute described herein in detail, for exemplary purposes, is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. A rain deflector chute for a vehicle having a roof top with an exterior surface, a side rear view mirror, and a window having a top and a side, said rain deflector chute comprising:
   a first planar chute member having a magnetized surface parallelly, magnetically couplable to an exterior surface of the roof top of said vehicle;
   a vertical planar chute member coupled to said first planar chute member to form an L-shaped member; and
   a second planar chute member downwardly sloped from said vertical chute member.

* * * * *